(12) United States Patent  
Lerner

(10) Patent No.: US 8,726,075 B1  
(45) Date of Patent: May 13, 2014

(54) METHOD AND APPARATUS FOR SCREENSHOT ARCHIVING TO DIGITAL VIDEO DISK (DVD)

(75) Inventor: Michah Lerner, Lakewood, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1433 days.

(21) Appl. No.: 10/366,878

(22) Filed: Feb. 14, 2003

(51) Int. Cl.  
*G06F 11/00* (2006.01)

(52) U.S. Cl.  
USPC ............................ 714/15; 714/6.23; 714/20

(58) Field of Classification Search  
None  
See application file for complete search history.

(56) References Cited

U.S. PATENT DOCUMENTS

| | | | | |
|---|---|---|---|---|
| 5,201,044 A | * | 4/1993 | Frey et al. | 714/20 |
| 5,398,331 A | * | 3/1995 | Huang et al. | 714/12 |
| 5,765,173 A | * | 6/1998 | Cane et al. | 707/204 |
| 6,449,739 B1 | * | 9/2002 | Landan | 714/47.2 |
| 6,480,944 B2 | * | 11/2002 | Bradshaw et al. | 711/162 |
| 6,573,915 B1 | * | 6/2003 | Sivan et al. | 715/781 |
| 6,615,365 B1 | * | 9/2003 | Jenevein et al. | 714/6.11 |
| 6,674,447 B1 | * | 1/2004 | Chiang et al. | 715/704 |
| 6,738,933 B2 | * | 5/2004 | Fraenkel et al. | 714/47.2 |
| 6,845,464 B2 | * | 1/2005 | Gold | 714/6 |

OTHER PUBLICATIONS

McCrary, et al., Eds.; DVD 2002: Standards, Applications, Technology Conference & Exhibition; Conference Proceedings the National Institute of Standards (NIST); Jun. 3-4, 2002; pp. 1-159.

* cited by examiner

*Primary Examiner* — Michael Maskulinski  
(74) *Attorney, Agent, or Firm* — Wolff & Samson, PC

(57) ABSTRACT

The present invention is directed to a method and apparatus for storing and reconstructing data. In one embodiment of the present invention, both real-time (i.e., dynamic) information and static information are stored in a Digital Video Disk (DVD) to replicate or restore an information system. The dynamic and static information are considered trust-support data. The trust-support data provides a complete view of the information system. For example, the state of current transactions operating in the information system is part of the trust-support data. The trust-support data may include GUI information, timestamp information, network information, authentication information, generalized receipts, and specialized receipts.

27 Claims, 4 Drawing Sheets

METHOD AND APPARATUS FOR SCREENSHOT ARCHIVING TO DIGITAL VIDEO DISK (DVD)

BACKGROUND OF THE INVENTION

1. Field of the Invention

This invention relates to data management. Specifically, the present invention relates to data storage and recovery.

2. Description of the Prior Art

Information systems are generally defined as systems, which manage information or data. Modern information systems typically include technology components, such as computer and communication hardware, used to facilitate communication between end-users. In addition, storage devices and software may also be considered components of an information system.

Various industries are based on the development, deployment, and management of information systems. For example, in a general sense, the Internet may be considered one large information system. Modern businesses make extensive use of information systems. For some businesses, information systems technology is the heart of the business and is critical to business operations. Therefore, any damage to the information system, the data used to operate the information system, or data stored on the information system could be disastrous for the business.

As a result, an entire industry is directed toward recovering the data, hardware, and software in an information system when a disaster occurs. The industry is loosely known as the "disaster recovery" industry. Disaster recovery typically involves a disaster recovery plan, which identifies the types of potential disasters and defines techniques to recover from a disaster should one occur.

A number of different types of disasters may occur and require the implementation of a disaster recovery plan. The types of disasters are typically referred to as threats to the information system. For example, the threat may be a man-made threat or a natural disaster. Man-made threats may include anything from faulty software to acts of terrorism. Natural disasters may include a flood or a hurricane that damages a computing facility, which houses the information system.

As a result, a disaster recovery plan may identify various threats, propose solutions to safeguard against the threat, and propose solutions for recovering data. Currently, a variety of conventional solutions are used to recover information or data in an information system. Many of these solutions revolve around backing up the data in the information system so that the data can be restored.

Backing up data for disaster recovery can be a costly endeavor if the proper backup procedures are not implemented. For example, depending on the size of the information system, a separate information system and associated support staff may be required to support the backup. Further, once there is a backup, the process of reconstructing the data is not trivial. Data reconstruction may often take a significant amount of time and money.

Current disaster recovery systems have various technical shortcomings. For example, current backup procedures are typically directed at backing up data and rarely backup other aspects of the information system. Since most disaster recovery systems concentrate on data, it may be difficult to get a complete picture of the information system before the disaster and, therefore, a complete recovery may not be possible. In addition, data storage becomes a problem, depending on the amount of data that is going to be stored; mass-storage may be required. Lastly, the media used for data storage may not be stable over time. For example, tape media has been shown to degrade over time and may not be suitable for long-term data storage.

In addition to the backups associated with disasters, companies often upgrade their computer systems and as a result, need to move data on old systems to new systems. Typically, a backup is required as part of this process. However, moving information between systems presents the same type of problems that occur when performing disaster recovery. While reconstruction of the data is possible, a full reconstruction of the system is typically not possible.

Thus, there is a need for a cost-effective disaster recovery system. There is a need for a method and apparatus of moving or restoring data. There is a need for a disaster recovery system that provides a complete picture of the information system prior to failure or disaster. Lastly, there is a need for a method and apparatus for storing large amounts of data on a durable medium that will last for a substantial period of time.

SUMMARY OF THE INVENTION

A method and apparatus is presented that enables the complete reconstruction of an information system. The method and apparatus of the present invention enables cost-effective mass storage of trust data (i.e., static and dynamic data). Trust data is identified as the data required to reconstruct an information system. Depending on the trust data selected and the frequency of storing the trust data, an information system may be reconstructed with a level of confidence. For example, an end user may be 40% sure, 70% sure, or 90% sure that they have fully reconstructed the information system. Once the trust data is identified and acquired, the trust data is stored in a durable long lasting medium, such as a Digital Video Disk (DVD). As such, a comprehensive, cost-effective backup is possible, which will allow an end user to reconstruct the information system to a specific level of confidence.

A method comprises the steps of providing specialized receipt information; providing generalized receipt information; providing timestamp information; providing network information; providing authentication information; providing encoded picture information; providing scheduler information; providing task queue information; and writing to a Digital Video Disk (DVD) in response to the specialized receipt information, in response to the generalized receipt information, in response to the timestamp information, in response to the network information, in response to the authentication information, in response to the encoded picture information, in response to the scheduler information, and in response to the task queue information.

A method of processing data comprises the steps of identifying trust-support data, the trust-support data characterizing operation of an information system; identifying secondary information which provides a context and a purpose of the trust-support data; and transmitting the trust-support data and the secondary information for storage.

A method of reconstructing information comprises the steps of accessing information stored in a memory, the information comprising trust-support data, the trust-support data comprising timestamp information, network information, authentication information, picture information, and receipt information; and reconstructing an information system in response to accessing the information.

A computer readable medium including computer readable code embodied therein, the computer readable code enabling reconstruction of an information system, the computer readable code comprises timestamp information, network information, authentication information, picture information, and receipt information.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A method and apparatus is presented for backing up and reconstructing data in an information system. The data is known as trust-support data and is defined as any data required to reconstruct a full information system environment. In one embodiment of the present invention, the trust-support data may be separated into two categories of data: dynamic data and static data. The dynamic data includes any data that characterizes dynamic activity in the information system. For example, any data that characterizes the state of an Internet session is considered dynamic data. Static data includes any other data. For example, software code (i.e., computer instructions) or a database of information may be considered static data.

The trust-support data provides a snapshot of the current operation of the information system. In one embodiment of the present invention, the trust-support data includes an image of the graphical user interface (GUI) at a specific time, a copy of the timestamps currently set and operating in the information system, a copy of the authentication activity currently implemented in the information system, and network information receipt information (i.e., generalized and specialized receipt information).

Figure 1:
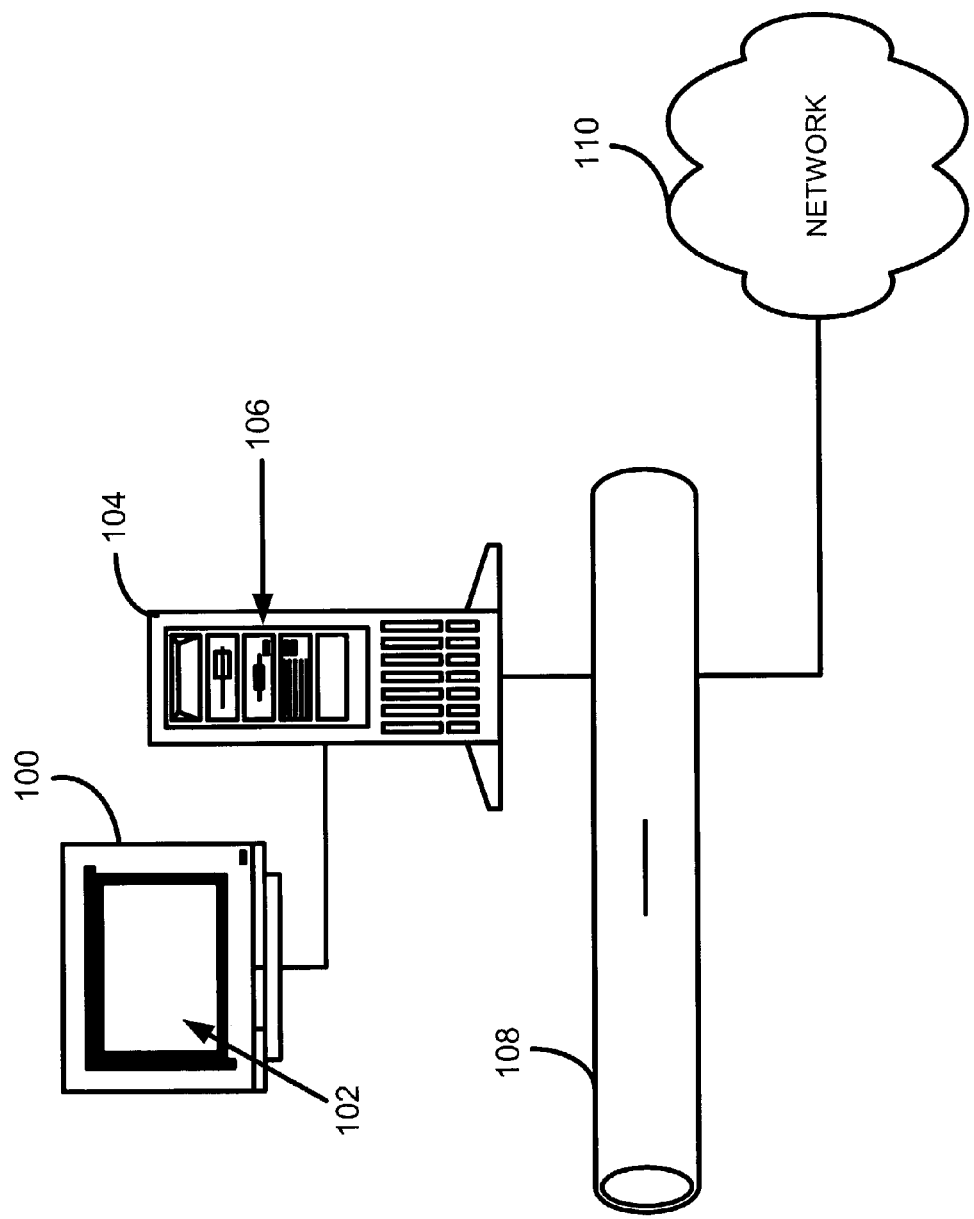
FIG. 1 displays a network implementing the teachings of the present invention.

FIG. 1 displays a network implementing one embodiment of the present invention. In FIG. 1, a monitor 100 is connected to a base station 104. The base station 104 is connected to a Local Area Network (LAN) 108. The LAN 108 is further connected to a network 110. It should be appreciated that while a specific embodiment has been presented, a number of variations may be implemented and still remain within the scope of the present invention. For example, the monitor 100 and the base station 104 may be implemented in a laptop computer. The base station 104 may connect directly to the network 110, connect through a wireless connection to the network 110, or connect through another appropriate communication technology. The network 110 may be a circuit-switched network, a packet-switched network, an Asynchronous Transfer Mode (ATM) network, a wireless network, or another appropriate type of network suitable for communicating information.

The monitor 100 includes a screen 102. The screen 102 displays information to an end user. In one embodiment of the present invention, the base station 104 and/or the monitor 100 include a display memory (not shown) for displaying information on the screen 102. Information is read out of the display memory and placed on the screen 102 for viewing. Consequently, a GUI or desktop image is written to the display memory and then placed on the screen 102.

A GUI, such as a web browser or a desktop image, is displayed to an end user in screen 102. In one embodiment of the present invention, current information in the GUI (i.e., a snapshot of the GUI) is considered trust-support data and is preserved in tamper-resistant storage for subsequent validation and reconstruction. A GUI snapshot is acquired by making a copy of the information in the display memory at a specific point in time.

The GUI snapshot captures the salient information necessary for reconstruction of the GUI or validation of any information or activity occurring in the GUI. For example, if an end user is logged onto a web site and is in the middle of purchasing an item when information system failure occurs, GUI snapshot(s) of each stage of the purchase transaction can be used later to validate that the end user purchased and paid for the item. It should be appreciated that the snapshot may be taken at different intervals. The chosen intervals correspond to the level of confidence that the end user requires for reconstruction. For example, if a GUI snapshot is taken every five minutes, the information system may be fully reconstructed with one level of confidence (i.e., 50%). On the other hand, if the GUI snapshot is taken every second, the information system may be reconstructed with another level of confidence (i.e., 80%).

A Digital Video Disk (DVD) recorder/player 106 is housed in the base station 104. In one embodiment of the present invention the trust data (i.e., screen information) may be stored in write-once media. For example, suitable Compact Disk-Write (CD-R) and DVD-R media in conjunction with appropriate recording modes may be implemented. It should be appreciated that, in an alternative embodiment, the DVD recorder/player 106 may be outside of the base station 104 and connect to the base station 104 through a network connection or directly connect through an interface in the base station 104.

In one embodiment of the present invention, a trade off is made between the confidence level required and the amount of storage available. For example, taking a snapshot of a GUI every second as opposed to every hour will require more storage. However, taking a GUI snapshot every second as opposed to every hour will produce a higher confidence level in the data available for reconstruction. In other words, an end user will be more confident that a specific interaction or transaction on the information system has been captured and is available for reconstruction, when a snapshot of the GUI is taken every second.

During operation, the network 110 may represent the Internet and an end user may use a combination of base station 104 and monitor 100 to surf the Internet by communicating across the LAN 108. While surfing the Internet, images will be displayed on the screen 102. Trust data, such as images displayed on the screen, are written to the DVD 106. As such, the information system may be reconstructed in the event of a disruption, disaster, etc.

Figure 2:
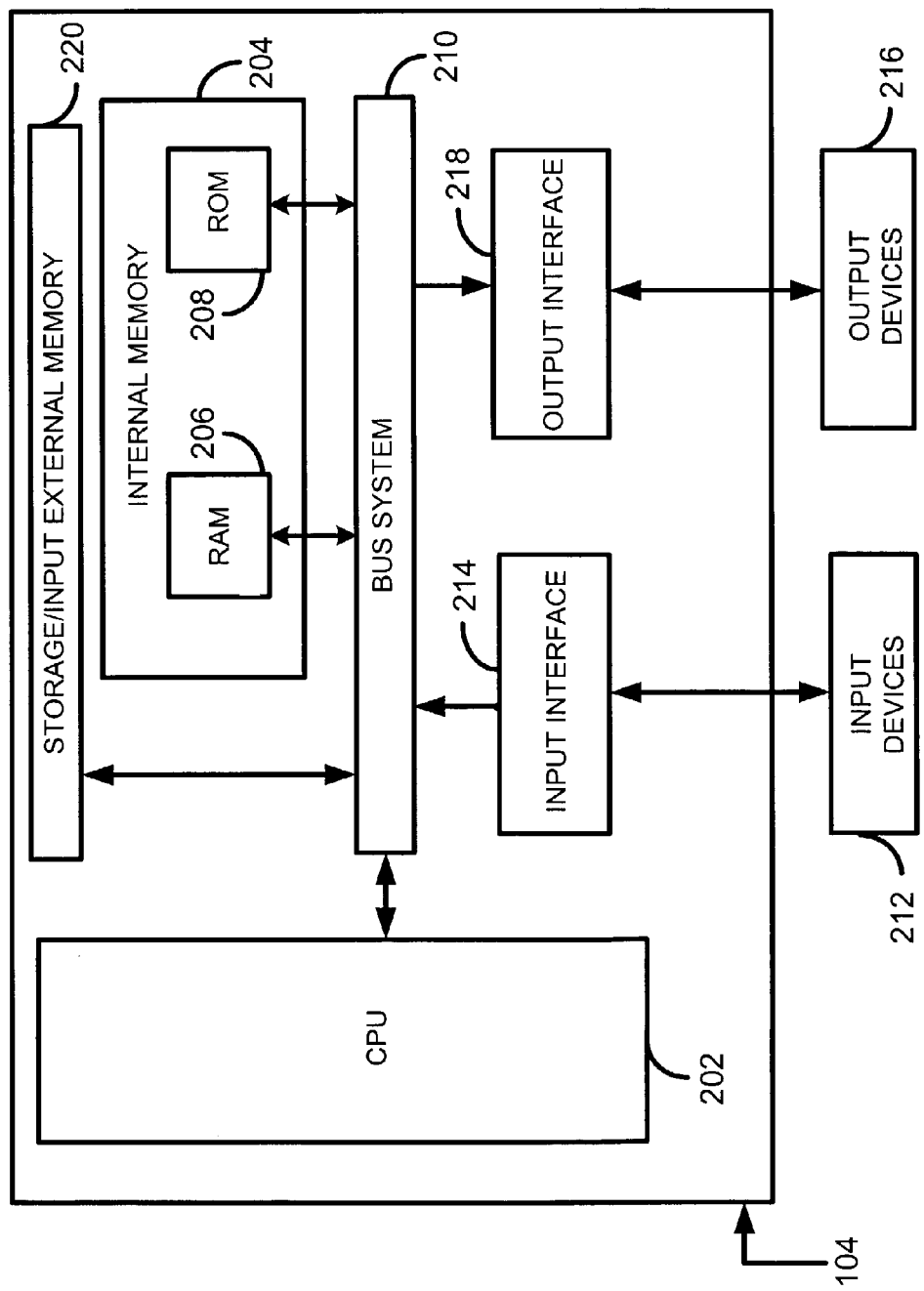
FIG. 2 displays a block diagram of a computer implemented in accordance with the teachings of the present invention.

In FIG. 2, a block diagram of the base station 104 of FIG. 1 is shown. A central processing unit (CPU) 202 functions as the brain of the base station 104 of FIG. 1. Internal memory 204 is shown. The internal memory 204 includes short-term memory 206 and long-term memory 208. The short-term memory 206 may be Random Access Memory (RAM) or a memory cache used for staging information. The long-term memory 208 may be a Read Only Memory (ROM) or an alternative form of memory used for storing information. In one embodiment of the present invention, a short-term memory, such as RAM 206, may be a display memory and used for storing a GUI for display on a monitor. A storage memory 220, such as a hard drive, is also shown. A bus system 210 is used by the base station 104 of FIG. 1 to communicate information between short-term memory 206, long-term memory 208, storage memory 220, input interface 214, output interface 218, and CPU 202. In addition, the bus system 210 may be connected to interfaces, which communicate information out of the base station 104 of FIG. 1 or receive information into the base station 104 of FIG. 1.

Input devices, such as a joystick, a keyboard, a microphone, a communication connection, or a mouse, are shown as 212. The input devices 212 interface with the system through an input interface 214. Output devices, such as a monitor, speakers, communications connections, etc., are shown as 216. The output devices 216 communicate with the base station 104 of FIG. 1 through an output interface 218.

In one embodiment of the present invention, the input devices 212 may be implemented as a DVD reader and the output device 216 is a DVD recorder or writer. It should be appreciated that when the DVD reader and recorder are combined in a single unit, the input devices 212 would be combined with the output devices 216. In addition, the input interface 214 would be combined with the output interface 218.

Figure 3:
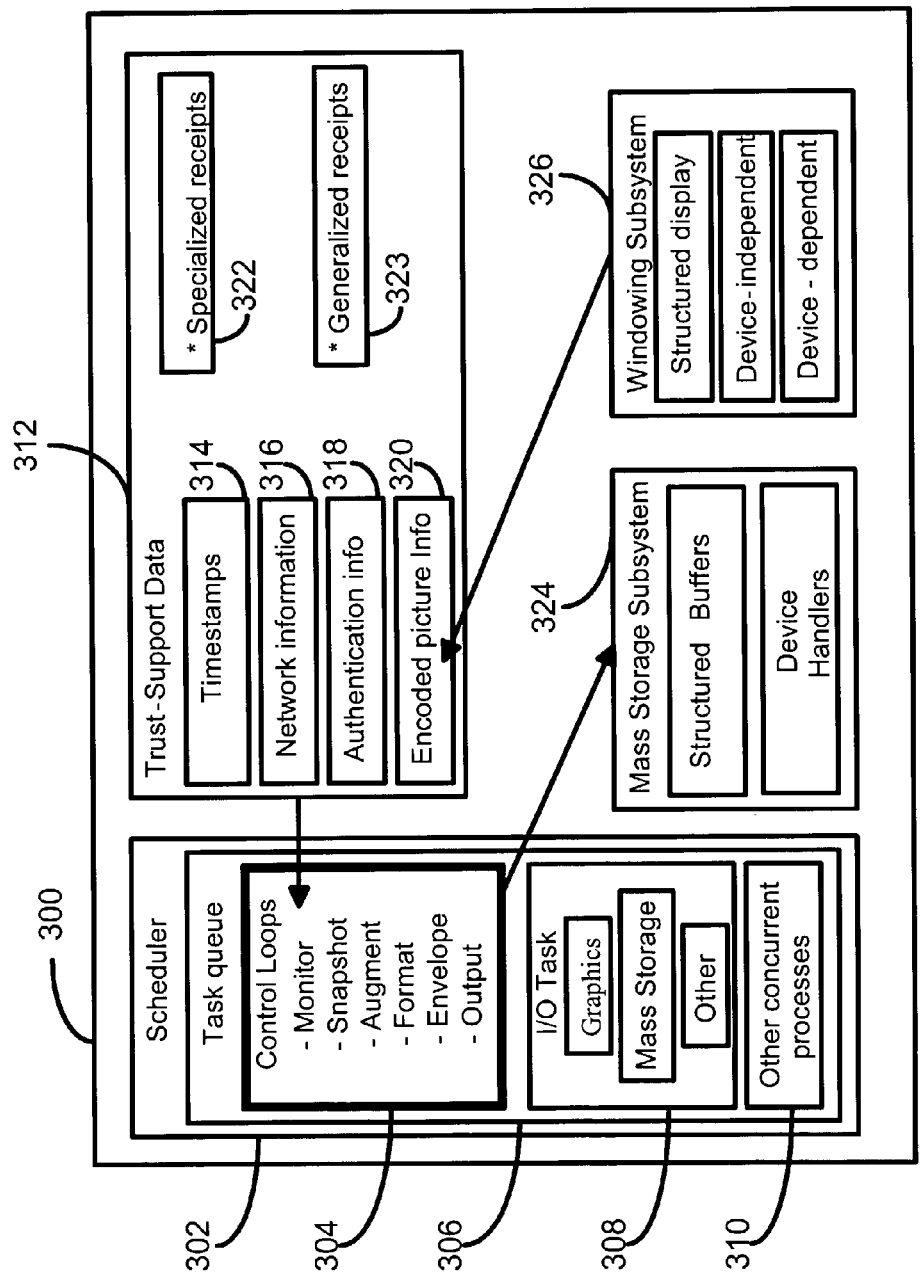
FIG. 3 displays an integrated model implementing the teachings of the present invention.

An integrated model 300 of the present invention is shown in FIG. 3. In one embodiment of the present invention, trust-support data is identified. Trust-support data is defined as the key data elements required to reconstruct salient aspects of an information system when data is corrupted, hardware fails, software is corrupted or fails, a disaster occurs, or when there is a need to replicate the information system for any reason. The trust-support data defines the static data on the information system, such as database information, software code, etc. In addition, the trust-support data includes dynamic data or transaction data, such as the current GUIs that are displayed on the screen, the current network connections, information input, information output, the current authentication status, etc.

Combining the trust-support data with other operating components (i.e., secondary information) of an information system will enable reconstruction and replication of the salient aspects of an information system in a way that the information system could not be replicated before at reasonable cost. In other words, an information-system snapshot is taken of the information system or eCommerce offer that is presented to the end user, along with sufficient supporting information (i.e., secondary information) to describe the context and purpose of the information being displayed. As such, an information-system snapshot is achieved by recording the trust-support data and the information required to describe the context and the purpose of the trust-support data. A level of confidence is then based on the frequency with which the information-system snapshot is stored, the specific trust-support data stored as part of the information-system snapshot, and the specific supporting material used to describe the context and purpose of the trust-support data.

The information-system snapshot includes both the static data and the dynamic (i.e., real time) data described above. The information-system snapshot includes, but is not limited to, trust-support data, scheduler information, tasks queue information, mass storage subsystem information, and windowing subsystem information. The information system is then written into a DVD for storage and retrieval. The DVD is properly indexed to enable the restoration of the information.

The trust-support data 312 includes any data required to ensure the veracity of the reconstructed or replicated information. In one embodiment of the present invention, the trust-support data 312 includes specialized receipts 322, generalized receipts 323, timestamps 314, network information 316, authentication information 318, and encoded picture information 320. The specialized receipts 322 include any information from third party software, such as an identification number, software configuration information, etc. Generalized receipts 323 include any information associated with standardized technology, such as information from cookies stored on the hard drive or hardware configuration information, such as Small Computer System Interface (SCSI) bus information, etc. These receipts may be corroborated by network-supported "validation support" services, such as company product registration web sites.

The timestamp information 314 includes any information associated with a timestamp, such as the specific time that different software components are operational, the time that software should automatically launch, the time that specific data was stored or processed in the system, or any time information associated with the operation of the information system. The network information 316 includes the current information coming in from the network, information communicated out to the network, various network settings, Internet sites that are currently connected, IP addresses and ports, tunneling endpoints or cryptographic contexts where encryption is in use, partial low-level protocol information to enable validation by a trusted third party (i.e., a hash of the TCP SYN numbers); and Internet sites that are part of the history log. The authentication information 318 includes any password or authentication information required for access including software keys and identification numbers, etc. The encoded picture information 320 includes a GUI snapshot. The encoded picture information 320 may include any picture information encoded for any reason. For example, picture information may be encoded for compression, security, etc. Compression encoding may include Motion Picture Expert Group (MPEG) encoding, etc.

The encoded picture information 320 may be compressed and stored. For example, in one embodiment of the present invention, the encoded picture information 320 is stored in a DVD. Where logging of such information presents unreasonable risks to privacy or security, partial log entries can be preserved as stored cryptographic hash values computed from the information. This allows verification that multiple parties have the same source information, but does not allow recovery of the information. Parties would need to agree to share the respective hashes for validation of stored data. A trusted third party "escrow service" can also resolve disputes when parties demonstrate legitimate possession of the cryptographic hash information.

The encoded picture information 320 is generated by the windowing subsystem 326. The windowing subsystem 326 includes structured display elements, device-independent display elements and device-dependent display elements. The elements of the windowing subsystem 326 are also stored so that the information system may be copied, reconstructed, or restored. Structured display elements include the GUIs that are displayed as part of web browser or a task bar that is associated with a word processing package. The device-independent display elements include elements that are displayed which are independent of the hardware that is used, such as the offer price for goods and services, and the pictorial description of an item offered for sale. The device-dependent display elements include elements that are displayed which are dependent on the hardware that is used, such as image resolution, audio bandwidth, and network delay between images or audio elements.

A scheduler 302 is identified in the present invention. The scheduler 302 launches different task in the information system and places the task in a task queue 306. Both the information in the scheduler 302 and the task queue 306 are stored so that the information system may be copied or reconstructed. For example, the scheduler 302 schedules the various task in the information system. Therefore, in the method and apparatus of the present invention, each task is scheduled, placed in the task queue 306, and then performed by the information system.

Once the tasks are scheduled, they are placed in a task queue 306. The task may be placed in the task queue 306 for first in first out (i.e., FIFO) processing, last in last out (LIFO) processing, or according to another algorithm. A variety of control loops 304 may operate within the task queue 306. The control loops 304 may include a monitor control loop, a snapshot control loop, an augment control loop, a format control loop, an envelope control loop, and an output control loop. The monitor control loop determines what information is required for validation, recovery, and reconstruction of system activities. The information is available from multiple sources and the most compact and common form is retained, with less compact or device-dependent information being preserved only when necessary to insure fidelity of the restoration or when needed to corroborate the reconstructed information. The snapshot control loop captures, compresses, and stores periodic images of the video display and audio input/output. These are collected periodically at regular N second intervals, when the screen image is sufficiently different from the prior screen image, on-demand, etc. The augment control loop collects corroborating information, which defines the relevance of the image captures. The format control loop compresses the information for storage and subsequent search-based recovery. The envelope control loop combines multiple relevant items and applies security (i.e., non-repudiation) technologies, such as cryptographic hashes.

In one embodiment of the present invention, storage of the most recently computed hash(es) is performed by carrying these forward into subsequent envelopes, thereby constructing a chain of validations and rendering infeasible the partial repudiation of a sequence of envelopes, without invalidating a substantially larger sequence of envelopes. The output control loop schedules the updates of the write-only media and coordinates buffer management.

Input/output (I/O) tasks 308 are also included in the task queue 306. For example, input and output to a graphics device, such as a graphics card is shown. Input and output to a mass storage device, such as a DVD writer is shown. In addition, other I/O task may be performed. Lastly, other concurrent processes 310 may be placed in the task queue 306. Other concurrent processes may be defined as authorized plug-ins supporting application-specific functionality through an extension mechanism.

A mass storage subsystem 324 receives output during operation of the control loops 304 tasks. The mass storage subsystem 324 may be a DVD writer, CD writer, optical storage device, tape storage device, etc. The mass storage subsystem 324 includes structured buffers and device handlers. The structured buffers include device-independent descriptions of visual or audio objects including vector graphic descriptions and object descriptions, audio description, such as MIDI; and device-dependent descriptions, such as image memory, frame buffers, and sound driver inputs. These buffers provide multiple granularities of presentation layers (input and output) and allow reconstruction of both the content as well as the operational status of the devices in use. The device handlers ensure the timely input/output behavior of the system through a multiplicity of methods including resource-driven device handlers that may sometimes drop or modify data in order to attain requisite data rates, as well as device-specific handlers that use bit-mapped, memory-mapped, and interrupt-driven communication with devices. Consequently, the specific handlers may influence the information presented to the user workstation and the concomitant retention requirement. In an embodiment, a few of these resources are selected and preserved on the archive media under control of the monitor-control loop above.

In one embodiment of the present invention, the mass storage subsystem 324 is a DVD device capable of storing information. For example, the DVD device may be a DVD device capable of storing information in a variety of formats, such as DVD+R, DVD+RW, DVD-R, DVD-RW, DVD RAM, etc.

Figure 4:
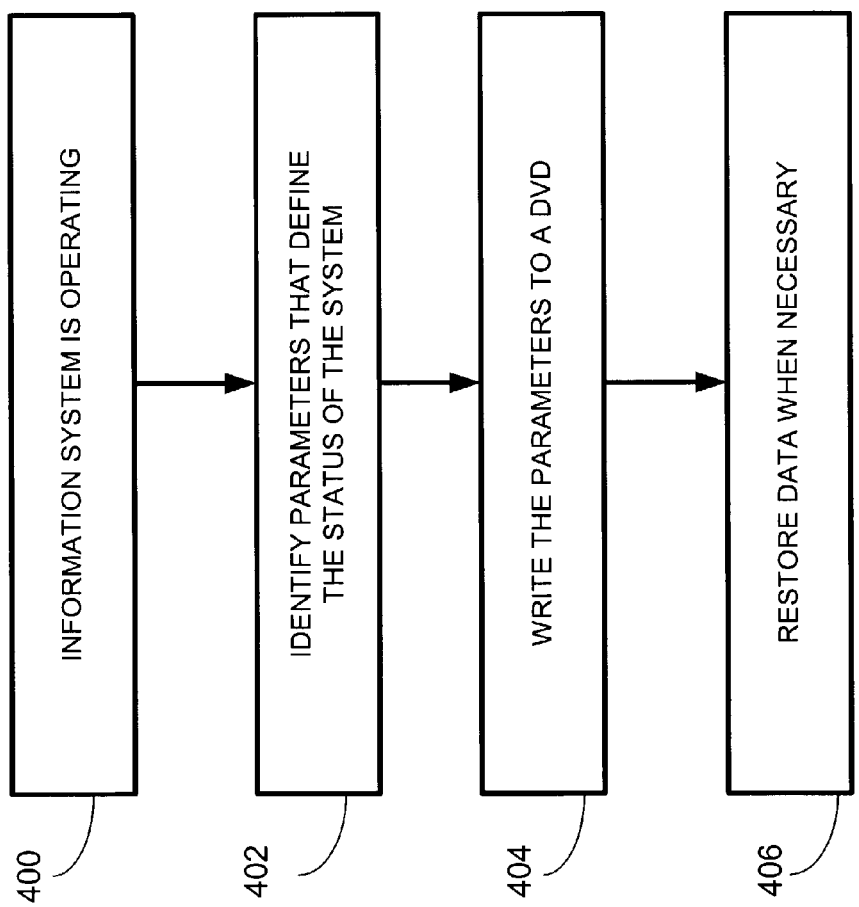
FIG. 4 displays a method of operating in accordance with the teachings of the present invention.

FIG. 4 displays a method of implementing one embodiment of the present invention. In FIG. 4, an information system is operating as stated at 400. During operation, an end user may operate the information system or the information system may perform batch processing. During operation, the information system generates trust-support data, schedules task by placing the task in the task queue, receives input from the windowing subsystem, and provides output to the mass storage subsystem.

In one embodiment of the present invention, an information system is operating as stated at 400. During operation an end user may operate a browser to search the Internet. As a result, trust-support data and secondary data used to interpret the trust-support data are generated and may be identified. Secondary information may include scheduler information, task queue information, control loop information, I/O task information, other concurrent processes, structured buffer information, device handler information, structured display information, device-independent display information, device-dependent display information, etc.

The trust-support data and the secondary data characterize the information system and are identified for storage as stated at 402. As stated at 404, information, such as the trust-support data and secondary information are written to a DVD where it is stored. At 406, the information may be recovered or restored when necessary.

Each activity, such as generating trust-support data, scheduling task by placing the task in the task queue, receiving input from the windowing subsystem, and providing output to the mass storage subsystem generates information, which characterizes the system at any specific point in time. For example, the state of the scheduler, the task in the task queue, the value and types of trust-support data currently available are defined at a specific point in time. By taking a snapshot of all of this information, it is possible to fully reconstruct or replicate the information system. The information that characterizes the information system is then written to a DVD and stored on the DVD in an appropriate format.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of processing data comprising:
    identifying trust-support data, the trust-support data characterizing operation of an information system and comprising specialized receipt information, generalized receipt information, and an image of a graphical user interface at a specific time acquired by copying information in a display memory, the information in the display memory copied when the image of the graphical user interface is sufficiently different from a prior image of the graphical user interface with respect to changes in trust-support data;
    identifying secondary information which provides a context for the trust-support data; and
    transmitting the trust-support data and the secondary information,
    wherein the specialized receipt information includes information from third party software and software configuration information, and the generalized receipt information includes hardware configuration information.

2. A method of processing data as set forth in claim 1, wherein the trust-support data comprises timestamp information.

3. A method of processing data as set forth in claim 1, wherein the trust-support data comprises network information.

4. A method of processing data as set forth in claim 1, wherein the trust-support data comprises authentication information.

5. A method of processing data as set forth in claim 1, wherein the trust-support data comprises encoded picture information.

6. A method of processing data as set forth in claim 1, wherein the trust-support data comprises scheduler information.

7. A method of processing data as set forth in claim 1, wherein the trust-support data comprises task queue information.

8. A method of processing data as set forth in claim 1, wherein the trust-support data and the secondary information are stored in a digital video disk.

9. A method of processing data as set forth in claim 1, wherein the method of processing is a method of storing data for reconstruction.

10. A method of processing data as set forth in claim 1, wherein the trust-support data is dynamic trust-support data.

11. A method of processing data as set forth in claim 1, wherein the trust-support data is static trust-support data.

12. A method of processing data a set forth in claim 1, wherein the transmitting the trust-support data and the secondary data is performed at predefined intervals.

13. A method of processing data as set forth in claim 1, wherein a level of confidence is determined in response to the trust-support data.

14. A method of processing data as set forth in claim 1, wherein a level of confidence is determined in response to the secondary information.

15. A method of processing data as set forth in claim 1, wherein the secondary information comprises scheduler information.

16. A method of processing data as set forth in claim 1, wherein the secondary information comprises task queue information.

17. A method of processing data as set forth in claim 1, wherein the secondary information comprises control loop information.

18. A method of processing data as set forth in claim 1, wherein the secondary information comprises one of input task information and output task information.

19. A method of processing data as set forth in claim 1, wherein the secondary information comprises structured buffer information.

20. A method of processing data as set forth in claim 1, wherein the secondary information comprises device handler information.

21. A method of processing data as set forth in claim 1, wherein the secondary information comprises structured display information.

22. A method of processing data as set forth in claim 1, wherein the secondary information comprises device-independent information.

23. A method of processing data as set forth in claim 1, wherein the secondary information comprises device dependent information.

24. A method of reconstructing information comprising:
    accessing information stored in a memory, the information comprising trust-support data, the trust-support data comprising timestamp information, network information, authentication information, picture information, specialized receipt information, generalized receipt information, and an image of a graphical user interface at a specific time acquired by copying information in a display memory, the information in the display memory copied when the image of the graphical user interface is sufficiently different from a prior image of the graphical user interface with respect to changes in trust-support data; and
    reconstructing an information system in response to the accessing information, wherein the specialized receipt information includes information from third party software and software configuration information, and the generalized receipt information includes hardware configuration information.

25. A method of reconstructing information as set forth in claim 24, wherein the memory is a digital video disk memory.

26. A computer readable storage device storing computer programs instructions for processing data, which when executed on a processor, cause the processor to perform operations comprising:
    identifying trust-support data, the trust support data characterizing operation of an information system and comprising specialized receipt information, generalized receipt information, and an image of a graphical user interface at a specific time acquired by copying information in a display memory, the information in the display memory copied when the image of the graphical user interface is sufficiently different from a prior image of the graphical user interface with respect to changes in trust-support data;
    identifying secondary information which provides a context for the trust-support data; and
    transmitting the trust-support data and the secondary information,
    wherein the specialized receipt information includes information from third party software and software configuration information, and the generalized receipt information includes hardware configuration information.

27. The computer readable storage device as set forth in claim 26, wherein the trust-support data comprises timestamp information.

\* \* \* \* \*